US 6,493,445 B2

(12) United States Patent
Garland et al.

(10) Patent No.: US 6,493,445 B2
(45) Date of Patent: *Dec. 10, 2002

(54) PROVIDING ALERTING/CALL WAITING/CALL HOLDING SERVICES TO ON-LINE INTERNET USERS

(75) Inventors: Stuart Mandel Garland, Morton Grove; ZhongJin Yang, Naperville, both of IL (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/397,208

(22) Filed: Sep. 16, 1999

(65) Prior Publication Data

US 2001/0040959 A1 Nov. 15, 2001

(51) Int. Cl.⁷ .................. H04M 3/00; H04M 5/00; H04L 12/66; H04J 1/02
(52) U.S. Cl. ............... 379/243; 379/229; 370/352; 370/493
(58) Field of Search ................ 379/142, 215, 379/93.35, 243, 229; 370/352, 493

(56) References Cited

U.S. PATENT DOCUMENTS

| | | | | |
|---|---|---|---|---|
| 5,761,292 A | * | 6/1998 | Wagner et al. | 379/229 |
| 5,946,381 A | * | 8/1999 | Danne et al. | 379/142 |
| 5,999,525 A | * | 12/1999 | Krishnaswamy et al. | 370/352 |
| 5,999,613 A | * | 12/1999 | Nabkel et al. | 379/215 |
| 6,067,353 A | * | 5/2000 | Szeliga | 379/93.35 |
| 6,078,581 A | * | 6/2000 | Shtivelman et al. | 370/352 |
| 6,097,795 A | * | 8/2000 | Ungruh et al. | 379/93.35 |
| 6,104,800 A | * | 8/2000 | Benson | 379/215 |
| 6,125,177 A | * | 9/2000 | Whittaker | 379/243 |
| 6,178,183 B1 | * | 1/2001 | Buskirk, Jr. | 370/493 |
| 6,226,287 B1 | * | 5/2001 | Brady | 370/352 |

* cited by examiner

Primary Examiner—Ahmad F. Matar
Assistant Examiner—Thjuan P Knowlin
(74) Attorney, Agent, or Firm—Werner Ulrich

(57) ABSTRACT

This invention relates to methods and apparatus for handling incoming or intra-office calls when a telephone subscriber having a POTS, (Plain Old Telephone Service) telephone instrument and line connecting that customer to a serving switch, is connected to an Internet service provider for providing communications to the Internet. The bandwidth of the customer's line is divided into a lower band for providing communications, and a higher band for transmitting signaling and control information. When an incoming or intra-office call is received while the customer is connected to the Internet, the signal channel is used to transmit information which can be displayed to the called customer providing information about the call. If the called customer wishes to answer the call, the called customer can signal over the signaling channel a request that the incoming or intra-office call be completed. Otherwise, the called customer can signal over the signaling channel to the switch requesting that busy tone be returned to the caller, or that the caller be connected to voice mail. Advantageously, this arrangement provides an inexpensive system for allowing Internet users to be notified about incoming or intra-office calls, and to accept such calls at their discretion.

10 Claims, 2 Drawing Sheets

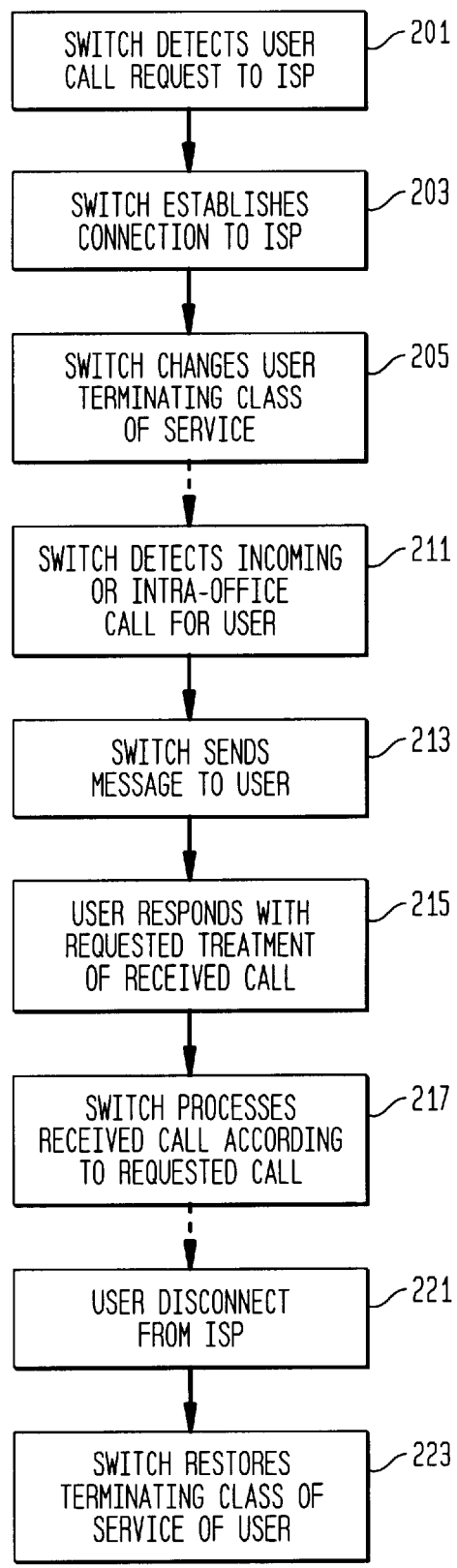

PROVIDING ALERTING/CALL WAITING/CALL HOLDING SERVICES TO ON-LINE INTERNET USERS

TECHNICAL FIELD

Figure 1:
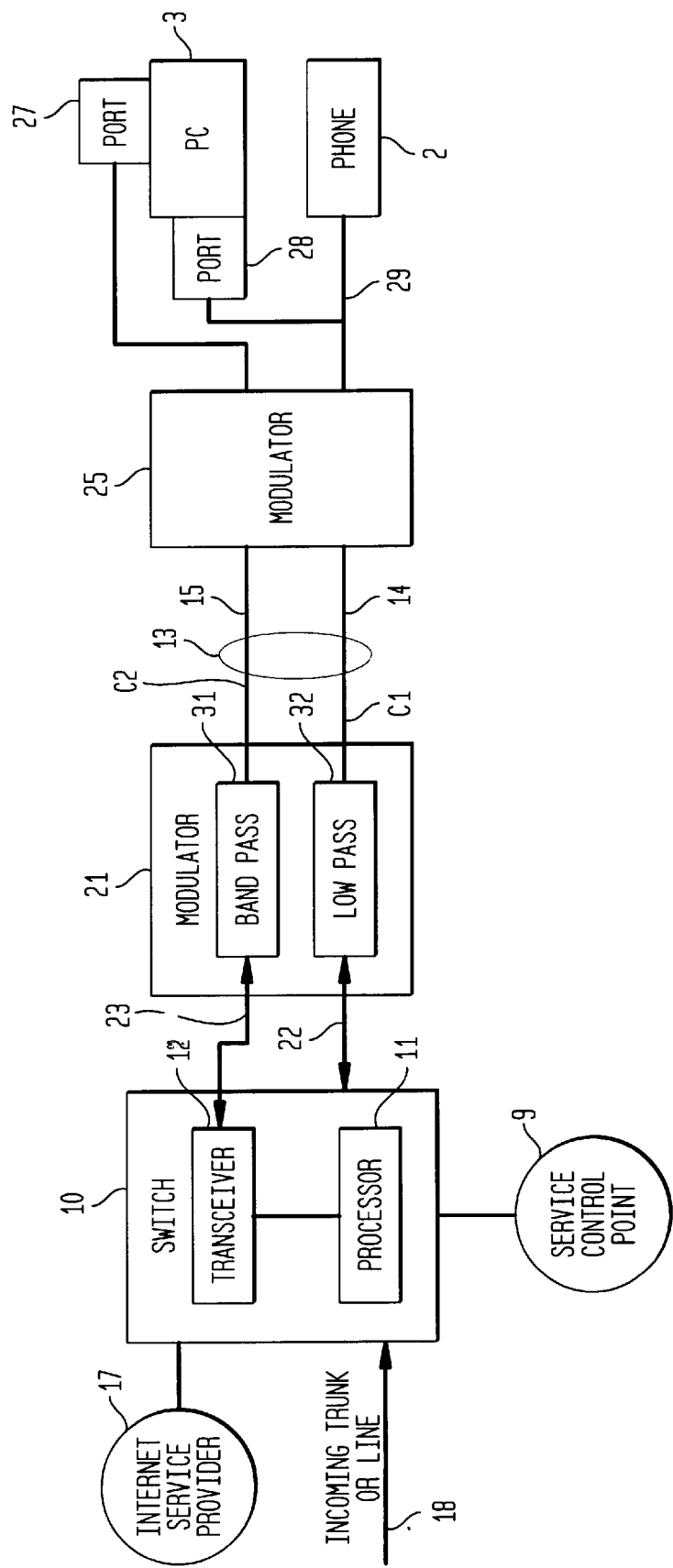

This invention relates to arrangements for exchanging signaling information between on-line Internet users and a serving telecommunications switch.

PROBLEM

Most Internet users are served by means of a direct connection to an Internet Service Provider (ISP). Frequently, such Internet users are on the Internet for an extended period of time. The arrangements for serving callers who call such heavy Internet users are not satisfactory.

SOLUTION

Applicants have studied the above problem in depth, especially for the many users of POTS, (Plain Old Telephone Service) analog telephones. While there have been various proposals for providing call waiting service to on-line Internet users, the arrangements require complex connections, using an Internet Telephony Gateway to channel all communications over a single Internet channel. What is lacking is a direct means for communicating with the switch serving the Internet user so that the Internet user can directly communicate with that switch in order to respond appropriately to an incoming call.

In accordance with Applicants' invention, the above problems are solved, and an advance is made over the prior art by providing a separate out of band channel for communicating between a customer's personal computer, (PC) and the telecommunications switch serving that customer. When a user establishes a connection to an Internet service provider (ISP), the serving switch is notified and changes the operation for processing incoming calls. The Internet user is notified of an incoming call, including the calling line identification, over the separate channel; this information is then displayed at the user's Internet station, usually a personal computer, (PC). The user then signals to the serving switch over that separate channel, a request for properly processing the incoming call. The incoming call may be put on hold, (with or without an announcement), and may be connected to the user as soon as the user disconnects from the Internet service provider (ISP); or the call may be re-directed to a Voice Mail System; or a busy signal may be returned to the caller; or the ISP can be connected to hold, while the user accepts the call. The choice among these treatments is provided by a message from the Internet user transmitted to the serving switch over the separate channel. Advantageously, this arrangement allows a maximum of flexibility in the responses of an on-line Internet user to incoming calls.

In accordance with one preferred embodiment of the invention, the second channel, (the signaling channel), is established by limiting the Internet communication to a first band-width, and setting aside a second non-overlapping band for the signaling channel. Advantageously, very simple circuitry can be used for creating the second channel. In the serving switch, a connection is made between the second channel and a means for receiving signals from, or transmitting signals to, the second channel. The receiving/transmitting means then communicate with the processor means of the serving switch to communicate information to the user, and to receive instructions from the user. The switch responds to the instructions by establishing connections between the incoming switch and the user, between the incoming call and Voice Mail, between the incoming call and a hold circuit, or the incoming call and a source of busy tone.

In accordance with one preferred embodiment, the serving switch recognizes a connection to an Internet Service Provider (ISP), by means of a directing code, dialed before dialing the number of the service provider. In an alternative embodiment, the switch has a list of telephone numbers of Internet Service Providers, and checks a dialed number against this list.

In the preferred embodiment, the switch provides normal service to the user when the user is idle, or when the user is not on an Internet connection. Advantageously, normal call waiting service, etc., can be provided to the user when the user is not on an Internet connection.

BRIEF DESCRIPTION OF THE DRAWING(S)

FIG. 1 is a block diagram, illustrating the operation of Applicants' invention; and FIG. 2 is a flow diagram, illustrating the operation of Applicants' invention.

DETAILED DESCRIPTION

FIG. 1 is a block diagram, illustrating the operation of Applicants' invention. The user's customer premises equipment 1, comprises a telephone 2, and an Internet station, a personal computer (PC) 3. The user is connected over a line 13, to a serving switch 10. The serving switch is connected, either directly or through the Public Switched Telephone Network to an Internet Service Provider (ISP) 17. When the user is not connected to ISP 17, the user receives normal telephone service. The switch is also connected to incoming trunks and other lines 18, and when the user is not connected to ISP 17, the connections between the user and unit 18 is processed in the arrangements of the prior art. However, when the user establishes a connection to ISP 17, switch 10 recognizes this connection and arranges for a temporary class of service to be provided to the user, which temporary class of service changes the treatment of incoming calls.

Line 13 is shown as providing 2 channels. A channel 14 is used for communications, both normal telephone communications, and communications with the IPS 17. Channel 15, in accordance with the principles of Applicants' invention, is used to convey signaling information between the switch 10 and PC 3, when the user at CPE 1 is connected to ISP 17. Terminating each end of line 13, is a modulator unit 21 and 25. Modulator unit 21 is shown in greater detail, and includes a low-pass filter 32, and a band pass filter 31. The band pass filter is used for connecting channel 15. In the case of modulator 21, the band pass filter is connected to a transceiver 12 when the user is connected to ISP 17, and incoming call is detected. Transceiver 12 passes received signals to processor 11 of switch 10, and transmits signals received from processor 11. In the case of Modulator 25, the low-pass filter is connected to port 28 of PC 3, and the band pass filter is connected to port 27 of PC 3.

The telephone 2 is connected to the low-pass filter of modulator unit 25. Thus, communication signals are passed via the two low-pass filters to the switching network fabric of switch 10, and the signals of the special signaling channel 13, are passed through the two band pass filters to the transceiver 12 of switch 10. The signaling channel is between port 27 of PC 3 and transceiver 12 of the switch. The communication signal, while communicating with ISP 17, is sent from port 28 of PC 3 through the two low-pass filters through the switching network fabric of switch 10 to ISP 17.

If, while the user at CPE 1 is on an Internet connection, an incoming or intra-office call is received at switch 10, switch 10 sends a message over channel 15 and port 27 to PC 3. PC 3 will display information that an incoming or intra-office call has been received, and will display the number and/or name of the caller on the received call. The user will then indicate how the call is to be disposed by sending a message from port 27 over channel 15, and transceiver 12 to switch 10 to indicate to switch 10 how the received incoming or intra-office call is to be processed.

Note that while, for reasons of simplicity in the explanation, channels 15 and 14 are treated as being separate, they are in fact, sent over a common line 13. It is the common line 13 which is connected to both the band pass filter 31 and the low- pass filter 32, with the result that the channel 14 is sent to a communication path 22, and a channel 15 is sent to signaling path 23.

In one preferred embodiment of Applicants' invention, the band of channel 14 is 0–4 KHz. The band of channel 15 is set to be distinguishable above the 4 KHz band, and is a relatively narrow band because the bandwidth required for signaling is small and because, for longer loops, the attenuation at higher frequencies increases rapidly. One candidate for the central frequency of Channel 15 is 10 KHz; this allows the filters to be relatively simple and low cost.

FIG. 2 illustrates the method of Applicants' invention. The switch serving the user, detects a call request to an Internet Service Provider (ISP), (Action Block 201). The switch establishes a connection to the ISP, (Action Block 203). The switch changes the incoming class of service for the user, (Action Block 205).

Some time later, the switch detects an incoming or intra-office call for the user, (Action Block 211). The switch sends a message to the user, informing the user of the incoming call, and providing the user with the telephone number and/or name of the caller, (Action Block 213). The user responds with a message providing the requested treatment of the received call, (Action Block 215). The switch processes the received call in accordance with the requested treatment, (Action Block 217).

Some time later, the CPE disconnects from the ISP, (Action Block 221). The switch then restores the incoming class of service of the user to its normal state.

Action Block 201 can be implemented by requiring users of Applicants' invention to dial a special directing code to inform the switch that requested connection is to an ISP. Alternatively, the switch can store a list of telephone numbers used for accessing ISPs from that switch, and can check all incoming calls from users of this service to detect if they are dialing the number of an ISP.

The requested treatments include the following:

(1) Return "busy" tone to caller of the received call (2) Route the received call to Voice Mail (3) Put the received call on "hold" pending further instructions from the user. The connection to "hold" may be connected by an announcement such as "Please wait a few seconds while your called party terminates his/her Internet session".

(4) Connect caller to user as soon as user disconnects from the ISP.

(5) Connect the ISP to a "hold circuit", and connect the user to the incoming call.

In accordance with an alternative embodiment of Applicants' invention, the terminating class of service of the called party, or at least a portion of this class of service, is stored in a service control point. Responsive to receipt of the incoming or intra-office call, switch 10 sends a request message to service control point 9, in accordance with the well-known principles of the Intelligent Network. The Service Control Point, in response to receipt of this message, sends a return message telling the switch how to process the incoming call. The use of the Intelligent Network arrangement for determining terminating class of service can be invoked either whenever the called user is on a connection to an Internet service provider, or the service control point may provide this information to the user at all times.

The above description is one preferred embodiment of Applicants' invention. Many other embodiments will be readily apparent to those of ordinary skill in the art, without departing from the scope of the invention. The invention is limited only by the attached Claims.

What is claimed is:

1. A method of providing terminating service to callers when the called party is a POTS, (Plain Old Telephone Service) telephone connected to the Internet, comprising the steps of:

providing a signaling channel separate from a communications channel between a switch serving the called user and the called POTS user;

responsive to receipt of a request to establish a connection from the user to an Internet service provider (ISP), temporarily changing the terminating class of service of said user;

thereafter, responsive to receipt of a terminating call for said user, sending a data message providing information about said terminating call to said user over said signaling channel;

receiving over said signaling channel from said user a response requesting terminating treatment for said call, said terminating treatment being one of a plurality of pre-defined treatments; and terminating said incoming or intra-office call in accordance with the requested treatment;

wherein the step of providing a signaling channel comprises the step of: providing a signaling channel separated in the frequency domain from a communication channel between said switch and said called POTS user;

wherein the signaling channel and the communication channel are both transmitted over a line connecting said switch and said called user; wherein said communication channel has a frequency band of a full POTS communication channel, and said signaling channel occupies a frequency band outside said frequency band of said full POTS communication channel.

2. The method of claim 1, wherein the terminating class of service of said user is stored in said switch.

3. The method of claim 1, wherein the terminating class of service of said user is stored in a service control point of an Intelligent Network.

4. The method of claim 1, wherein the step of sending a data message providing information about said incoming or intra-office call comprises the step of sending calling line identification information.

5. The method of claim 1, wherein one of said plurality of pre-defined treatments comprises the step of returning busy tone to the caller of said incoming or intra-office call.

6. The method of claim 1, wherein one of said plurality of pre-defined treatments comprises the step of routing the received call to voice mail.

7. The method of claim 1, wherein one of said plurality of pre-defined treatments comprises the step of placing the received call on hold pending further instructions from the user.

8. The method of claim 1, wherein at least one of said plurality of pre-defined treatments comprising connecting the calling customer to an announcement.

9. The method of claim 1, wherein at least one of said plurality of pre-defined treatments comprises the step of connecting the caller to the user as soon as the user disconnects from said Internet service provider.

10. Apparatus for providing incoming or intra-office completing service to callers when the called party is a POTS (Plain Old Telephone Service), connected to the Internet, comprising:

a separate signaling channel and a communications channel connecting said called POTS telephone to a switch serving the called user;

responsive to receipt of a request to establish a connection from the user to an Internet service provider (ISP), for temporarily changing the terminating class of service of said user;

means responsive to receipt of an incoming or intra-office call for said user when said user's terminating class of service has been temporarily changed for sending a data message providing information about said incoming or intra-office call to said user over said separate signaling channel; means for receiving from said user a response requesting terminating treatment for said call, said terminating treatment being one of a plurality of pre-defined treatments;

means for terminating said incoming or intra-office call in accordance with the requested treatment;

wherein said signaling channel and said communications channel are transmitted over a single path from said POTS telephone to said switch, wherein said communications channel is a full POTS communications channel, and said signaling channel is transmitted over said single path at a frequency band outside a frequency band of said full POTS communications channel.

* * * * *